(12) United States Patent
Smith et al.

(10) Patent No.: US 6,747,977 B1
(45) Date of Patent: Jun. 8, 2004

(54) PACKET INTERFACE AND METHOD OF PACKETIZING INFORMATION

(75) Inventors: Roger Smith, Billericay (GB); Simon Daniel Brueckheimer, London (GB); Fai Tsang, Chelmsford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/437,063

(22) Filed: Nov. 9, 1999

(30) Foreign Application Priority Data

Jun. 30, 1999 (GB) .............................. 9915327

(51) Int. Cl.$^7$ .............................................. H04L 12/56
(52) U.S. Cl. ................... 370/395.64; 370/466; 370/474
(58) Field of Search ................................ 370/473, 474, 370/395.1, 395.6, 395.61, 395.64, 466, 470, 471, 392, 393, 401, 465, 468, 476

(56) References Cited

U.S. PATENT DOCUMENTS

| | | | | |
|---|---|---|---|---|
| 6,151,321 A | * | 11/2000 | Benson et al. | 370/395.42 |
| 6,324,179 B1 | * | 11/2001 | Doshi et al. | 370/395.61 |
| 6,341,131 B1 | * | 1/2002 | Eneroth et al. | 370/395.61 |
| 2002/0093939 A1 | * | 7/2002 | Nakano et al. | 370/349 |

OTHER PUBLICATIONS

The ATM Forum Technical Committee, UTOPIA, Specification, Level 1, Version 2.01, af–phy–0017.000 dated Mar. 21, 1994.

The ATM Forum Technical Committee, UTOPIA Specification, Level 2, Version 1.0, af–phy–0039.000 dated Jun. 1995.

* cited by examiner

Primary Examiner—Chau Nguyen
Assistant Examiner—Soon-Dong Hyun
(74) Attorney, Agent, or Firm—Barnes & Thornburg LLP

(57) ABSTRACT

To obviate inefficient use of bandwidth in a packetised system, such as a broadband ATM domain, the use or amount of header information sent in relation to a channel is restricted by one of two principal mechanisms, as exemplified in FIGS. 3 and 4. First, control information incident to a packet interface (20) is interrogated by a processor (21) to determine (50) packet length requirements. A packet length indicator is then generated (52) for inclusion within a header (44) of a packet. Alternatively, a frame (30) is prepartitioned (60) into several packets (32–42) having different lengths. An addressed subscriber unit (28) is allocated (64) a particular channel, i.e. at least one particular packet within the frame (30), based on data throughput requirements (62), whereby the location of the packet within the frame inherently identifies the length of the packet. Optionally, the data rate used within that packet may also be identified inherently by the location of the packet within the frame (30).

22 Claims, 2 Drawing Sheets

PACKET INTERFACE AND METHOD OF PACKETIZING INFORMATION

BACKGROUND TO THE INVENTION

This invention relates, in general, to an adaptable interface between a broadband-narrowband network and in which adaptation is required between time division multiplexed (TDM) communication and asynchronous transmission mode (ATM) communication. More particularly, but not exclusively, the present invention is applicable to an interface provisioned to support numerous different adaptation protocols, especially adaptation layer two (AAL-2), and a method of packetizing information to optimise utilisation of available bandwidth.

SUMMARY OF THE PRIOR ART

Globally, telecommunication systems can generally be considered to be in a transitional phase between first generation narrowband digital networks (such as the global system for mobile (GSM) cellular communication system) and future multi-media digital networks (such as the universal mobile telecommunication system (UMTS)) having broadband capabilities. Indeed, radio frequency (RF) and wireline systems are being merged together to enhance the information transfer mechanism, while still providing some flexibility with respect to mobility within the network. For example, broadband (typically fibre-optic based) infrastructure connections are being utilised to support information (both voice and data) transfer between cellular RF coverage areas. The transition to broadband systems is, in fact, necessarily required to support higher data rate communications, including video and Internet applications that are presently being both considered and made available to subscribers to the service.

A key goal of development of telecommunications networks is to realise the potential integration of real-time and non-real-time services. The key examples of these two types are voice telephony and computer data. Voice telephony is served predominantly by a circuit switched connection orientated network, arranged to deliver a guaranteed quality of service (QoS). Such networks are implemented by transport and switching systems that use a time division multiplexing scheme. Computer data is served predominantly by the Internet that uses a packet forwarding connectionless mode of operation, i.e. a workable paradigm best suited to the burstiness of traffic demand and general non-deterministic nature of this traffic type.

The technologies and protocols that will serve the integration of these two different types of service are presently being decided by network operators. In this respect, the two main contenders for universal transport and switching are ATM and Internet Protocol (IP), although there are many other legacy systems and nascent technologies that may offer specialised solutions to carrying key services.

Present broadband digital networks are characterised in that user and control information is transmitted in fixed "packet" lengths for the duration of a call, with these packets pre-pended with headers that contain bearer channel identification. Such a broadband system is described in the requirement of the ATM Forum Utopia Level 1/2 Interface. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmissions are, however, similar to that for the narrowband case and differ only in as much as the signalling schemes are technology specific.

To facilitate use of broadband networks and the migration of communication networks to high data-rate technologies (e.g. the two mega-bit per second rate envisaged within UMTS), there is a need to provide an effective mechanism for interconnecting narrowband networks through a transparent broadband ether. In other words, the broadband ether must accommodate and support narrowband signalling schemes without affecting either data integrity or in any way inhibiting data flow or interconnection. As such, a narrowband-broadband interface must contain adaptation modules that freely translate between TDM and ATM, for example.

ATM has been designed from the outset to adapt to many different types of communications traffic. ATM is a connection orientated network mechanism, allowing dynamic bandwidth configuration and flexibility as a key advantage over circuit switched networks. ATM has adaptation layers for carrying given services over ATM transport and switches. However the fixed length of ATM cells, while suitable for segmentation of long data packets, thereby simplifying and streamlining switching technologies, is still too large for certain compressed voice services, that suffer a 'cellification' delay, affecting existing network delay budgets and acceptable voice characteristics. Indeed, when considering the issues of delay, meaningful voice communication across a channel is achieved with a pure delay of less than one hundred and fifty (150) milliseconds. However, since the signal is likely to suffer from echo, telecommunications standard bodies have stipulated that echo cancellation must be applied to all channels having a one-way delay of greater than twenty-five milliseconds. Unfortunately, in relation to cell assembly of a sixty-four kbps PCM voice channel, a delay of six milliseconds is introduced merely by the provision of sampling. Consequently, an allowable path delay is immediately reduced to nineteen milliseconds, which reduced period is easily exceeded in moderate and long distance calls, e.g. a long distance call between Washington D.C. and San Francisco. Furthermore, conversion of the cell into a narrowband component for onward routing of the call further reduces the available nineteen milliseconds assigned to accommodate all additional delays.

There are, in fact, already a plethora of broadband adaptation schemes that are presently employed or which are being developed or evolved to cope with broadband transmissions. Specifically, ATM adaptation layer protocols such as AAL-1 (and structured data transfer, SDT), AAL-2 and AAL-5 impose very different requirements on processing capabilities of a communication network, especially in relation to a narrowband-broadband interface.

AAL-1 is an ATM adaptation protocol targeted at constant bit rate (CBR) traffic, e.g. voice or video, and is applicable to data rates equal to or exceeding sixty-four kbps (64 kbps). More particularly, narrowband voice signals at 64 kbps are packaged into ATM cells having an overall length of fifty-three bytes; five bytes of which are used as a cell header whilst the remaining forty-eight bytes support the payload. The cell header contains control and routing information, such as the virtual circuit identifier (VCI). With respect to the payload in AAL-1 SDT (structured data trasfer), a first byte (or "octet") is reserved for a sequence number that provides an error correction facility, while the remaining forty-seven octets are allocated to voice samples. Every eight cells, the first byte is stolen from the forty-seven octets allocated to voice samples of that cell, and is stolen byte is used as a pointer to indicate a structure boundary. The pointer field therefore allows multiplexed transmissions of multiple voice channels, as will be appreciated.

ATM cells can also be formatted in 16-bit words, rather than the more frequently used eight bit word structures described in the immediately preceding paragraph. To accommodate this increase in traffic, each ATM cell is extended to fifty-four bytes, arranged in words with the first three words used for the ATM cell header and twenty-four words sent as traffic in the remaining words of the extended ATM cell.

Eight and sixteen bit buses are particularly suited to byte-based services, and also give backwards compatibility with the ATM Forum Utopia Level 1/2 Interface (see The ATM Forum, "Utopia, AN ATM-PHY Interface Specification Level 1, Version 2.01", Mar. 21st 1994 (AF-PHY-0017.000), and The ATM Forum Utopia Level 2. Version 1.0, June 1995 (AF-PHY-0039.000)).

In the case of both the fifty-three byte and fifty-four byte ATM cells, the transmission length of the ATM cell is fixed and constant for the entire duration of the call.

AAL-5 provides a capability of data and voice transmissions to work stations, and is therefore particularly applicable to multi-media communication systems. AAL-5 segments long data structures into many cells, with a data structure conceivably exceeding fifteen hundred octets in length. AAL-5 similarly provides error correction in the packetised header, while also using a bit in the header to indicate the continuation or end of a long data structure. Furthermore, control information included within the AAL-5 protocol also stipulates how may cells have been consolidated together to produce the long data structure and will also include CRC check bit information for error correction. When carrying voice, the AAL-5 structure is typically only one cell in length and, as such, may require the provision of echo cancellers. However, the support of data communications by AAL-5 is inherently immune to delay because data transmissions are not time dependent for coherent understanding.

ATM Adaptation Layer 2 (AAL-2) is distinct from other ATM adaptation layers since it de-couples voice packets from ATM cell boundaries, and also since mini-packets from several calls can be multiplexed into a single ATM connection. This multiplex is asynchronous to the cell boundary and further effectively introduces a new switching layer above the ATM layer.

More specifically, the AAL-2 adaptation scheme is designed to support compressed voice at or below rates of sixty-four kbps. Indeed, compression algorithms, such as ADPCM (adaptive differential pulse code modulation) or LD-CELP (low-delay, code excited linear prediction) can enable voice channels to be compressed from sixty-four kbps to rates typically between four kbps and thirty-two kbps. Additional channel utilisation can be achieved by suppressing any silent intervals that occur naturally in speech (especially bearing in mind that one person in a call is typically silent when listening to the other party talk), which suppression can enable a further bandwidth saving of over 50%. As will be appreciated, the communication system is most efficient when maximum traffic is being passed, i.e. at a rate of 64 kbps, although lower rates utilising coding techniques are subject to flow control constraints to maintain cell timing/arrival (i.e. cell flow) and cell delination.

AAL-2 services may be packet based as well as TDM based.

With respect to AAL-1, it is not possible to support silence suppression and it generally takes too long to fill an ATM cell with low data rate compression schemes. In fact, in an eight kbps compression scheme, it takes forty-seven milliseconds to fill an ATM cell and this results in an unacceptable delay (and the necessity for the use of expensive echo-cancellation techniques) in voice communication. These problems, however, can be addressed and to some extent resolved by using AAL-2 that multiplexes a number of compressed voice channels into a single ATM virtual channel (VC). In fact, the packet lengths in AAL-2 can be arbitrarily small (from one octet to sixty-four octets in length) which enables the packet size (and hence the sampling delay) to be tailored to the compression rate being used (e.g. at 8 kbps a packet payload size of eight octets takes just eight milliseconds to fill).

Looking at byte insertion rates, a 64 kbps codec generates eight thousand (8000) bytes per second or one byte every one hundred and twenty-five microseconds (125 $\mu$s). In contrast, a 32 kbps codec produces 4000 bytes per second or one byte every 250 $\mu$s. In fact, AAL-2 actually partitions data into forty byte packets (equivalent to five millisecond (5 ms) time segments).

AAL-2 allows up to two-hundred and fifty-six mini-channels to be supported on a single ATM virtual channel (VC). Furthermore, as will be understood, AAL-2 is a relatively new standard that, at present, is not widely used and, in some instances, is less efficient than AAL-1. More specifically, in the latter respect and specifically in relation to relatively long data structures, AAL-2 requires an increased control overhead associated with the provision of additional mini-cell headers.

Clearly, in the event that a transmitter has optional selection of codec rate, e.g. based on line quality, it is essential that different packet (and hence rates) are clearly associated to avoid misinterpretation of data caused by incorrect timing recovery.

In an attempt to improve efficiency in terms of packaging information into ATM cells, it has previously been contemplated that the cell length could be extended or reduced by clearly marking the end of a cell. However, this idea is not physically compatible with the existing Utopia interface standard for ATM transmission. More especially, the marking of the end of packet locations requires the use of an end of packet identifier and hence a distinct and separate data line into an ATM interface. Putting this another way, the previous proposal could not include end of packet information inherently within the combined data, address and control bus originating from the TDM domain. Consequently, the combined bus would therefore need to be physically widened, i.e. extended, to support the inclusion of a further control bit associated with the subsequent inclusion within the ATM cell of an end of cell marker.

To complete the picture, Internet Protocol (IP) was designed for computer communications, although it has been recently demonstrated to be suitable for real-time services if congestion can be controlled to an extent that permits an acceptable quality of service to be achieved. Much activity surrounds investigations and implementation of mechanisms for limiting the degree of congestion and controlling quality of service in IP networks, including the Real-Time Protocol (RTP) that was invented to carry real-time traffic, in particular voice and video services that the existing transport protocols (TCP and UDP) cannot cater for. RTP takes into account the lossy behaviour of IP networks when congested, in a manner suitable to real-time services.

UDP has no necessary timing or sequence information; TCP does not account for the low-delay and immediacy of real-time service requirements, e.g. a late packet should be dropped rather than retransmitted.

In IP, congestion and packet loss can be limited by reserving bandwidth on key routes in the IP network, as implemented in the Reservation Protocol (RSVP). This mechanism in effect makes the connectionless network behave as if connection orientated, since all packets entitled to use the reserved bandwidth must follow an established route. Such IP mechanisms are generally analogous to ATM QoS and virtual path (VP) and virtual connection (VC) partitioning. However, the particular issue of IP packetisation delay affecting delay sensitive services has not been addressed for two reasons, namely IP packets may be variable length (and therefore the packetisation delay is arbitrary); and IP networks carrying voice are, in practice, yet to achieve an acceptable QoS.

Therefore, as will be appreciated, because of the limited availability of bandwidth (arising from limited spectrum, increasing numbers of users and enhanced services) in any communication system, including broadband ATM systems, it is always desirable to optimise transmission formats to enhance data throughput. Furthermore, subscribers demand an acceptable quality of service, especially in relation to voice communication, which quality of service cannot presently be provided by IP techniques. A need has therefore been created for an interface to an adaptation device, with characteristics that are flexible enough in particular to take full advantage of the enhanced features of AAL-2, whilst providing compatibility with other adaptation layers.

SUMMARY OF THE INVENTION

According to a first aspect of the present invention there is provided a method of sending information in packets over a multiplicity of frames, the method comprising: pre-partitioning each frame into a plurality of slots of which at least some may have differing durations to others, each of the plurality of slots associated with at least a defined packet length and a channel; and packetising information into a slot allocated to a call for transmission to an addressed unit, the packetised information containing a truncated header of reduced length arising from the slot allocated to the call inherently identifying the packet length thereof and the channel.

In another aspect of the present invention there is provided a packet interface for coupling between a narrowband domain and a broadband domain, the packet interface arranged to packetise information from the narrowband domain to the broadband domain into variable length packets, the packet interface having associated therewith: a processor arranged to construct a plurality of contiguous frames with each frame pre-partitioned into a plurality of slots of which at least some may have differing durations to others, each of the plurality of slots associated with at least a defined packet length and a channel, the processor further comprising: means to packetise information from the narrwoband domain into a slot selectively allocated to a call for transmission to an addressed unit, the packetised information containing a truncated header of reduced length arising from the slot allocated to the call inherently identifying the packet length thereof and the channel.

Preferably, the processor further comprises: means to assess at least one of a data transmission requirement for the call and a subscriber processing capability of the addressed unit in the call; and means to select and allocate the slot within the frame based on the assessment The processor may further comprise means for notifying the addressed unit of the slot allocated to the call.

In another aspect of the present invention there is provided a method of sending information in packets comprising: receiving information from a channel and constructing at least one intermediate packet associated with that channel during a first time segment; generating an intermediate packet header having an intermediate packet length indication identifying a number of intermediate bytes received from the channel within the first time segment; communicating the intermediate packet header and the at least one intermediate packet to a broadband signal processor; receiving the intermediate packet header at the broadband signal processor and interrogating the intermediate packet header to identify the number of intermediate bytes that can be expected at the broadband signal processor during a second time segment; determining whether the at least one intermediate packet to be received at the broadband signal processor should be temporarily stored or converted into a broadband packet for onward transmission; and generating a broadband packet including a header containing a length indication if the at least one intermediate packet is to be converted into a broadband packet for substantially instantaneous onward transmission, else temporarily storing the at least one intermediate packet and incrementing a record of a number intermediate packets temporarily stored in relation to said channel.

The length indication in the broadband packet is variable and dependent upon the number of intermediate packets that are to be transmitted in the broadband packet.

The method preferably further comprises repeatedly storing contiguous intermediate packets incident on the broadband signal processor during successive time segments and incrementing the record of the number intermediate packets temporarily stored in relation to said channel.

The method may comprise comparing the record of the number of intermediate packets with a predetermined threshold and constructing a broadband packet and associated length indication when the record of the number of intermediate packets is at least equal to the predetermined threshold.

A particular embodiment of includes the step of temporarily storing the intermediate packets is overridden on the basis of one of an addressing unit's identity and an addressed unit's identity.

In yet another aspect of the present invention there is provided a packet interface comprising: a) a first buffer and processor combination arranged to receive information from a channel and to construct intermediate packets associated with that channel during a first time segment, the processor including: means for generating an intermediate packet header having an intermediate packet length indication identifying a number of intermediate bytes received from the channel within the first time segment; and means for communicating the intermediate packet header and the intermediate packets to a broadband signal processor; b) a signal processor and channel buffer combination, the signal processor coupled to receive the intermediate packet header and arranged to interrogate the intermediate packet header to identify the number of intermediate bytes that can be expected at the broadband signal processor during a second time segment, the signal processor further comprising: means for determining whether the intermediate packet to be received should be temporarily stored or converted into a broadband packet for onward transmission; and means for generating a broadband packet including a header containing a length indication if an incident intermediate packet is to be converted into a broadband packet for substantially instantaneous onward transmission, else means for temporarily storing the incident intermediate packet in the channel buffer and incrementing a record of a number intermediate packets temporarily stored in relation to said channel.

The length indication in the broadband packet may be variable and dependent upon the number of intermediate packets that are to be transmitted in the broadband packet.

In a particular embodiment, the signal processor and channel buffer are further arranged to repeatedly store contiguous intermediate packets incident on the broadband signal processor during successive time segments and wherein the signal processor further includes means for incrementing the record of the number intermediate packets temporarily stored in relation to said channel.

The signal processor preferably further comprises: means for comparing the record of the number of intermediate packets with a predetermined threshold; and means for constructing a broadband packet and associated length indication when the record of the number of intermediate packets is at least equal to the predetermined threshold.

The signal processor may be arranged to override the temporary storage of the intermediate packets on the basis of one of an addressing unit's identity and an addressed unit's identity.

The packet interface is typically included within a broadband/narrowband communication network, and especially in relation to a TDM/ATM interworking environment.

The preferred embodiments of the present invention can therefore support a dynamic change in packet length (i.e. the use of variable packet lengths in a broadband environment) in each connection during a call, with the system of the preferred embodiment able to provide multiple channel capacity to supply a switching adaptation device capable of supporting both a full range of voice services as well as data services. More particularly, the present invention is able to make better use of limited bandwidth resources by optimising data (i.e. payload and packet) transmission at the expense of header information considered redundant in relation to a specific call, i.e. there is no waste of bandwidth through optimised header encoding.

Beneficially, the preferred embodiments of the present invention provide a parallel signal interface for variable length packet transfer between hardware devices carrying a multiplex of connections. Indeed, the interface provides the means for full flow control on a packet by packet basis, where the packet length may be known implicitly in advance of transfer, known implicitly or explicitly to be limited in length in advance of transfer, or unknown implicitly or explicitly in advance of transfer. Furthermore, the interface can provide a mechanism for arbitration between multiple transmitters of packets and multiple receivers of packets and can also align a concatenation of shorter, fixed length packets to the start of longer packets for transmission and compatibility purposes.

BRIEF DESCRIPTION OF THE DRAWINGS

An exemplary embodiment of the present invention will now be described with reference to the accompanying drawings, in which.

DETAILED DESCRIPTION OF THE PREFERRED EMBODIMENT

Figure 1:
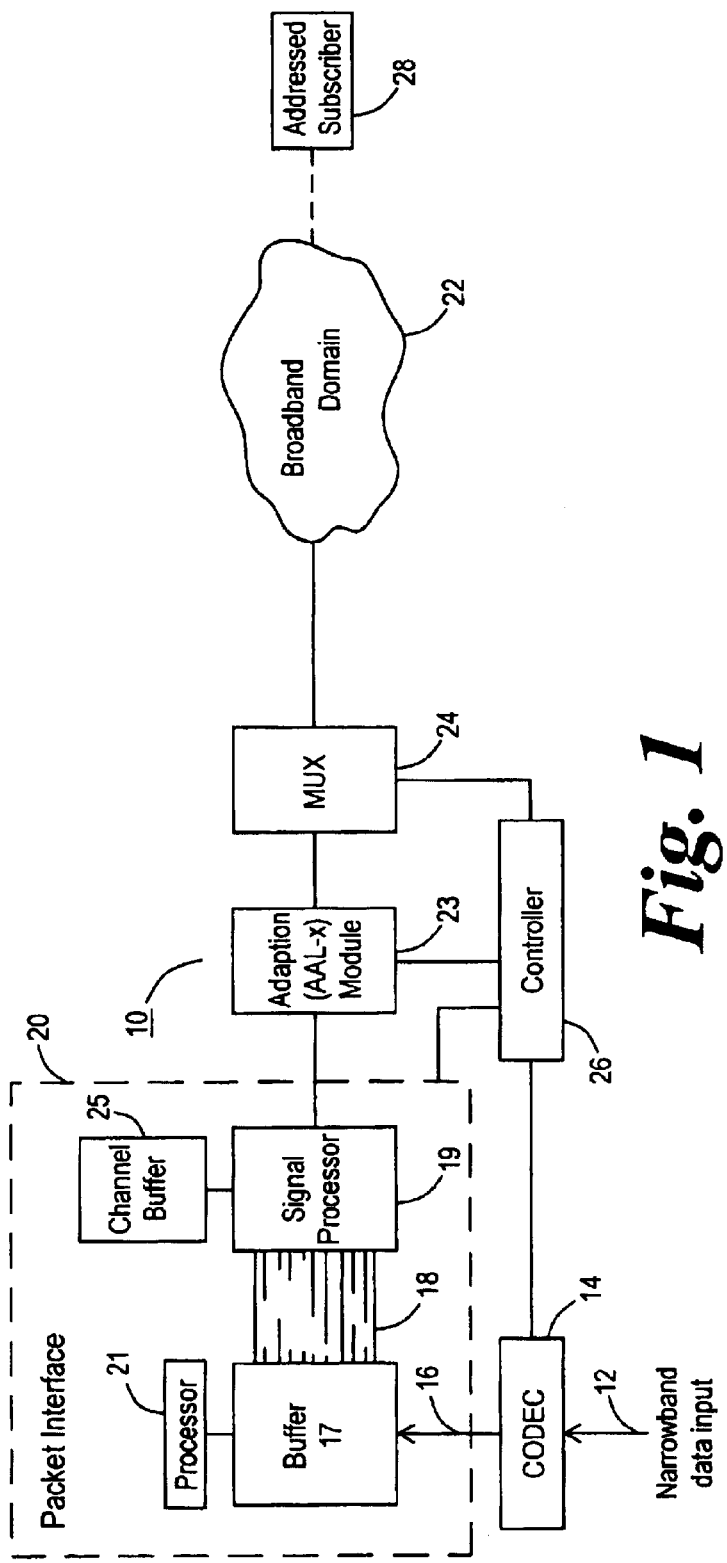
FIG. 1 is a simplified block diagram of a narrowband-broadband processing arrangement that supports the packetisation methodologies of the preferred embodiments and different aspects of the present invention.
Figure 2:
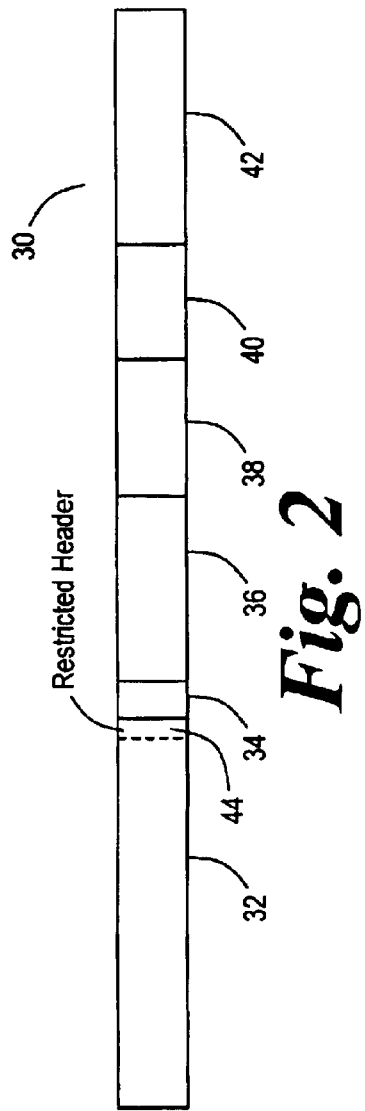
FIG. 2 shows an exemplary packetised frame structure of a preferred embodiment of the present invention.

Referring briefly to FIG. 1 that exemplifies a narrowband-broadband processing architecture 10 that supports packetisation of data according the various embodiments of the present invention. Narrowband data 12, for example, is applied to a codec 14 for coding at a selected data rate.

The codec 14 could therefore be a multi-rate codec having microprocessor controlled rate selectivity. Usually, once coded, data 16 is buffered (in buffer 17) before being applied through a parallel bus 18 to a signal processor 19. Buffering of the coded signals effectively assembles intermediate packets in a form suitable for further signal processing within the packet interface 20. The buffer 17 is further coupled to a processor 21 that is arranged to interrogate information incident to the buffer 17. More specifically, the processor 21 is arranged to identify the number of intermediate packets (i.e. data words usually made up of two bytes each) that are associated with a particular channel, with the processor 21 then able to provide an intermediate packet header that is communicated to the signal processor 19 over the parallel bus 18. The intermediate packet header includes an express indication of the number of intermediate packets received in a particular time and associated with a particular channel, which intermediate packets will therefore follow the intermediate packet header and be incident on the input ports of the signal processor 19. In response to being informed of the number of intermediate packets that the signal processor 19 can expect in relation to a particular channel, the signal processor 19 operates in one of two fashions.

First, the signal processor 19 can decide to construct a broadband packet (containing a variable number of bytes) and send this to a broadband domain 22 via an appropriate adaptation module 23 and, optionally, a multiplexor 24. In order to form the broadband packet, the signal processor 19 generates a header having a variable packet length indication that reflects the number of intermediate packets that are to follow the header. Clearly, in this instance, there is a direct one for one transposition between the express indication of the number of intermediate packets (i.e. the length of the traffic communication at an instance in time in relation to a particular channel) and the number of bytes transmitted in the broadband packet. Therefore, conversion of the intermediate packets into a broadband packet (or cell) is substantially instantaneous, and is only delayed by processing overhead and appropriate boundary alignment for the broadband packet (or cell).

The choice of how many bytes are included in a broadband packet is entirely arbitrary, and so situations may arise when data from a particular source is significant enough for a broadband packet to be sent even though the percentage of actual traffic within a broadband packet is little more (or indeed less) than the overhead associated with sending the header. However, it is likely that most broadband packets will support data of about twenty to thirty words (i.e. forty to sixty bytes), although smaller and larger broadband packets are clearly possible and contemplated.

Second, should a particular channel only supply a relatively low number of intermediate packets (initially accumulated in the buffer 17) over a period of several contiguous data entry periods, then the signal processor 19 can itself buffer these intermediate packets in a channel buffer 25 (in an appropriate form) and further associate an accumulating total of the number of intermediate packets received by the signal processor 19 in relation to that particular channel. In other words, the intermediate packet header facilitates the temporary storage of successive channel specific data in the channel buffer, with the express indication of the number of intermediate packets supplied by the intermediate packet header used to increment a record of the number of intermediate packets that are presently stored in the channel buffer in relation to a particular channel. When the signal processor 19 deems that it has enough data in relation to a particular channel to warrant the construction of a broadband packet, then the signal processor 19 constructs such a broadband packet and includes in the broadband packet header a variable packet length indication that accurately reflects the number of bytes that are to be sent in that broadband packet. Again, the level at which construction of a broadband packet is warranted is arbitrary, and so there is generally a variation in the number of bytes sent in the broadband packet. Indeed, should there be a fixed level then it is quite possible that the successive arrival of intermediate packets (containing differing numbers of data words) is in a fashion that results in a final number of temporarily stored intermediate packets significantly exceeding this arbitrary level, although with the ability of the present invention to handle variable length packets this is not an issue.

In summary of the second process, the processor 21 appends a length indication to an intermediate packet header that generally precedes the transfer of intermediate (traffic) packets to the signal processor 19. Successive intermediate packets associated with a particular channel are stored in the channel buffer 25. Once the signal processor 19 has counted in a predetermined number of words from the intermediate packets, then a broadband packet and associated header is constructed by the signal processor 19. Moreover, the broadband packet includes a cumulative (and time varying) packet length indication. Consequently, there is a saving of overhead by virtue of the delay in sending broadband packets and the redundancy resulting from all packetised information relating to a single channel.

The parallel bus 18 typically supports eight or sixteen bits of data (i.e. eight or sixteen bit words) as well as control and address lines. The intermediate packet header, as well as traffic, will therefore each be seen as successive words appearing across the parallel inputs to the signal processor 19

The packetisation process is generally controlled by a controller 26 which is therefore coupled to the functional blocks within the narrowband-broadband processing arrangement of FIG. 1.

As will now be appreciated, the packet interface 20 therefore includes the parallel bus that partitions buffer and processor arrangements (19 and 25 as opposed to 17 and 21) that operate in a complementary fashion to construct broadband packets from intermediate packets, with both forms of packet containing a header with some form of traffic length indication included therewithin by the respective processor. The packet interface 20 generally provides a cell/packet delineation function.

As will be understood, the architecture of FIG. 1 shows the principal path from narrowband to broadband conversion. It will be appreciated, that a reverse (e.g. receiver) arrangement would include a demultiplexor in substitution for multiplexor 24, with the process flow otherwise merely reversed through the packet interface 20, buffer 17 and codec 14.

There are two principal mechanisms employed in the respective preferred embodiments of the present invention to modify packet length in an ATM environment.

Figure 3:
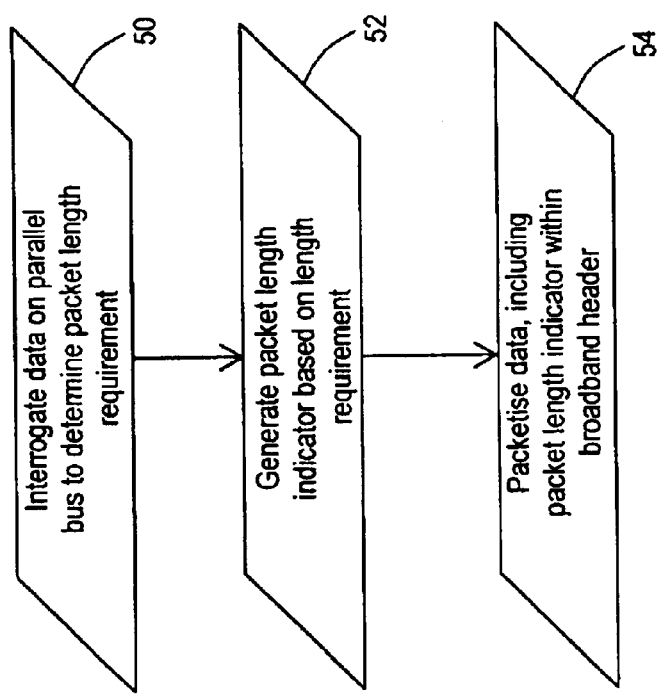
FIG. 3 is a flow chart showing preferred steps of a first packetisation process according to the present invention.

First, as shown in FIG. 3, processing capability of the packet interface 20 is arranged to interrogate 50 a header field incident to the packet interface 20 in one of the control lines of the parallel bus 18. Subsequently, a packet length indictor is generated 52 for inclusion 54 within the packetised information. Therefore, an extended packet of data can be communicated to an addressed subscriber unit (reference numeral 28 of FIG. 1) without the need to send repeated header information that merely duplicates now superfluous channel identity information and the like. Bandwidth utilisation is thereby rendered more efficient in terms of data throughput.

In the first instance, the length is unknown in advance of the receipt of the packet at the interface associated with the addressed subscriber unit. As such, the current packet length may be carried, as a binary number, in the current packet or, alternatively, the packet length may be carried in the header in a coded form (with the code being predefined on both sides of the interface to equate to a particular length). A codec change could also be identified by a change to the form of the coding used in the header. In either case, the length information is carried in a predefined section of the packet and extracted on arrival at the receiver to determine the length. Where a limited subset of lengths is required, e.g. if 10, 20, 30 and 40 bytes are the possible options, a two-bit code provides a compact solution as contrasted with a six-bit binary code representation for the a 40 byte packet. The code, according to a preferred embodiment, may also convey other information such as the number of packets required to assemble a longer transmitted packet.

This form of "direct identity" provides a first mechanism by which multiple connections can be multiplexed onto a common bus. Basically, the header contains the identity of the connection in place of, or in addition to, the standard ATM header information. This allows complete freedom to multiplex connections, subject only to the range of identity assigned and the available bandwidth. Direct identity is intended for use where asynchronous (variable bit rate) services are carried, or where an excessively diverse range of voice services must coexist. It is suitable for a voice or data adaptation device.

As regards flow control, the first embodiment of the present invention adopts known flow control signalling methodologies for the direct identity packet interface, namely: signalling schemes that identify cell availability to identify that an addressed slave device is ready to send/receive a whole cell; addressing of slave devices by the master; enable activation from the master device to cause a cell transfer on the selected slave device; and "Start of Cell" for definition of the first byte/word of a cell/packet.

In relation the receive section of the packet interface of the first embodiment, the same signals as the standard master Utopia Receive interface are specified. Each address is polled in turn by the master, and the 'receive cell available' (RxClav) inputs from the addressed slave are tested; the active responses may be stored. For compatibility, but not as a restriction, address 31 (for example) is defined out of range, and is used to separate valid address polling. On the last cycle of any current packet transfer, the device address of the next packet to be transferred is output with RxEnb (receive enable) set invalid. The slave devices decode the address, and with RxEnb valid again, the selected slave starts the new packet one cycle after the current one ends. The entire new packet is transferred from the addressed port irrespective of subsequent changes to RxAddr (receive address), but is delayed if RxEnb goes inactive during transfer.

In relation the transmit section of the packet interface of the first embodiment, the same signals as the standard master Utopia Transmit interface are specified. Each address is polled in turn by the master, and the 'transmit cell buffer available' (TxClav) inputs from the slave are tested; active responses may be stored. For compatibility, address 31 is defined out of range, and is used to separate valid addresses. As soon as the current packet transfer is complete, the address of the next packet to be transferred is output by the master. On the next cycle, TxEnb and TxSOC (transmit start of cell) are set valid and the first word (or byte, if using 8 bit data buses) of the new packet is output, followed by the rest of the packet in successive cycles. The packet must be taken by the selected slave irrespective of subsequent changes to TxAddr, though the transfer is suspended if TxEnb goes inactive.

Turning to the question of arbitration between multiple transmitters and multiple receivers in the direct identity packet interface (DIPI) of the first embodiment, the standard flow control supports connection between one physical interface (master) and multiple DIPIs (slaves). To extend the usage to connect multiple DIPIs to multiple physical interfaces, the interfaces must be de-coupled by an interconnected circuit manager that arbitrates between them. In the Ingress direction (data flow towards the DIPI), the essential functions of the circuit manager are to:

provide a standard MPHY interface to the physical interfaces;

take packets via this MPHY and assemble queues for each DIPI, using the identifier in the packet header to select the queue. This may require full address mapping and packet tagging;

assign priority to each populated queue;

monitor 'Cell available' status of each DIPI;

extend active 'Enable' to the top priority DIPI with space available, and transmit the packet; and repeat on next highest priority.

In the Egress direction (data flow away from the DIPI), the essential functions of the circuit manager are to:

assign priority to each DIPI that has active 'Cell available';

extend active 'Enable' to the top priority DIPI and complete transaction of one packet into a FIFO;

assemble packet queues for each physical interface, using the identifier in the packet header to decide the destination. This may require full address mapping and packet tagging; and transfer packets from the queues to the physical interfaces via a standard MPHY interface.

In a second embodiment, a frame 30 of broadband data is pre-partitioned 60 to support a plurality of different length packets 32–42, some of these being relatively short (e.g. packets 34 and 40) and some being relatively long (e.g. packet 32). Advantageously, since the frame 30 is pre-partitioned, an identity of each packet is implicit from its location within the frame 30 and so the requirement to send channel identification information or length information within any header 44 is eliminated. Based on data transmission requirements (and subscriber processing capabilities) 62, appropriate packets are allocated to an addressed subscriber. The addressed subscriber unit is informed 64 of the channel identity (i.e. allocated packet location) within the frame, with the addressed subscriber unit then able to decode 66 the broadband data based on implicit knowledge of the packet length and data rate thereof arising from packet location within the frame 30. In other words, an assigned length is determined based on the position of the packet within a delineated time domain. With the elimination of the requirement to transmit header information, more data can be included within the frame, thereby improving efficiency of data transfer through the restricted bandwidth allocated to the system.

The concept of pre-provisioning can also apply in the context of a particular connection, e.g. whenever subscriber terminal "x" is addressed, it immediately receives an enlarged packet size since, for example, it has an acknowledged priority for a relatively higher data throughput. Again, packet length extension (in this case) is realised by the processing and interrogation capabilities of the packet interface 20, whereby header information can be truncated to improve efficiency in relation to bandwidth utilisation.

Therefore, in the second embodiment of the present invention the identity of a packet is defined by its order of arrival within a frame period. Typically, the frame period is defined by an applied marker. The start of each packet is identified by the use of a 'Start of Cell' bit, or by a fixed timing structure. A new period is initiated either on reactivation of the marker, or at a predefined time after the start of the current period. The identity may follow a fixed pattern or a random (but specified) pattern. The pattern repeats every frame. As indicated previously, this method provides a bandwidth-efficient solution (particularly if the packet length is also set indirectly), as fewer header bytes are required. Its structured form is designed for synchronous, constant bit rate services, although it application is not limited to such. It is particularly suitable for a voice adaptation device with a compatible mix of services.

The preferred embodiments of the present invention are therefore particularly relevant to services such as narrowband TDM (time division multiplexed) voice to AAL-2 broadband services.

It is preferably that the packet interface 20 is realised as a full duplex parallel interface, since this provides a simple, low risk method of providing a high bandwidth interface with the additional benefits in that there is a potential to share the parallel (data) bus 18 with multiple devices, e.g. different physical ports. Furthermore, such an interface can often be tailored to suit particular applications by, for example, trading-off between bandwidth, bus size and frequency capabilities.

Another mechanism by which a variable packet length can be achieved is through the concept of having length dependent upon the service being supported across the broadband domain. Consequently, the packet interface 20 reacts to the service (as does the addressed subscriber terminal) by adjusting its performance accordingly. Again, when service specific packet lengths, header information pertaining to packet length can be omitted and overhead therefore reduced to the benefit of traffic throughput. In other words, the packet length is defined by the characteristics of the service being carried.

It is, of course, feasible to indicate the length of a packet in a previous packet header, although this is less efficient (in terms of bandwidth utilisation in the traffic throughput sense) since it generally requires repeated transmission of the length indicator in communications requiring multiple packets.

Generally, as will now be appreciated, the end of a packet utilised in the present invention is inferred from the pre-defined or programmed header length plus the implicit or explicit payload length.

As regards flow control in the case of indirect identity, this variant uses the same physical packet interface, but conventional flow control is not retained. Instead, the following controls are used: 'Enable' input: One bit is used to define the boundary of the frame structure. The frequency of packet transfer can be made programmable, in 1 ms steps for instance, to suit different applications. The boundary marker must occur at a multiple of the transfer rate. For a given service the packet payload size may increase proportionately with repetition period; Address inputs: Decoded to detect if the device is selected for exchange of packet. The applied address will change in a preset pattern, allowing the cell stream to be shared by several devices. For instance, the address could increment after each packet allowing 1-in-2, 4, 8, 16 or 32 packets to be selected by decoding the address;

'Cell available' outputs: One bit is used to indicate which packets are active. Packets are accepted up to the maximum number specified, after which 'Enable' goes inactive until a new period begins. It is noted that, in a device that handles the whole bandwidth, 'Enable' may be permanently active.

'Start of Cell': Used to mark the first byte/word of a packet. In the data input direction, this signal may be used to initiate transactions. Optionally, it is not provided/ignored if a regular pattern of packet arrival, timed on the marker, is assumed. It is always provided in the output direction.

In the case arbitration in the indirect identity packet interface (IIPI), arbitration is done by pre-assignment of slots within the time domain; as previously described. The outputs of multiple transmitters are multiplexed into a single cell stream from which multiple receivers extract the assigned packets by reference to a common timing marker.

To meet the requirement that service changes occur on transmitted packet boundaries, an alignment bit is defined in the packet header that, when set, indicates a significant event; this ensures alignment of interface packets that are a fraction of a transmitted packet. The alignment bit is co-directional with the data flow. The significant event can indicate the start of a packet, the end of a packet or an agreed offset from either start or end. This, for example, is used to signify the start of an AAL-2 SDU (service data unit) from the adaptation layer to a codec, such that a change in codec rate can be aligned with a packet boundary.

The packet interface of the present invention has several application, e.g. it is arranged/designed to carry non-packet based ITU-T G.series voice codec services for AAL-2 adaptation, and additionally, where the codec or stream is 64 kbps PCM (G.711), for AAL-0, AAL-1 and AAL-5 adaptation. This is an example of synchronous packet mode operation of the indirect identity packet interface. Use is restricted to single channel adaptation, i.e. one circuit to one B-ISDN connection. AAL-0 takes a 1–48 byte payload, AAL-1 takes 1–47 bytes (non-P format only) and AAL-5 takes 8–40 bytes to construct an ATM cell. The AAL-2 packet is of variable size, depending on the service type, but always has an integer number of encoding data units (EDUs).

For G.711, other EDU periods than 1 ms can be selected when all eight bits are used per octet. The interface uses a fixed frame structure with allocated slots for each channel's EDU. The frame length is the nominal EDU duration in octets (8 for 1 ms) multiplied by the number of channels. When fewer than 8 octets are active, i.e. shorter EDUS, then the active octets are padded at the end of the allocated slot with dummy octet periods.

The control requirements depend on the adaptation type, a given channel connection, and the direction (either Ingress or Egress). The code field of the ATM packet used for AAL-2 implicitly contains the packet length, so the explicit value is not required. The packet length is optional, and can be used for AAL-0/1/5 to transfer 64 kbps in arbitrary amounts. LOS (loss of synchronisation) is activated on multiple cell/packet loss (AAL-1/2), pointer resynchronisation (AAL-1) and store underflow and overflow (AAL-0/1/2/5). LOD (loss of data) is activated on single lost or discarded cell/packet (AAL-1/2), store overflow, and trailer error (AAL-5). The alignment indicator (EIS) delineates the boundary of an SDU when it is a concatenation of several EDUs transferred across the interface. It may, for example, indicate the end of an SDU. By this means, changes in codec and SDU size can be synchronised to the SDU boundary, as required by the AAL-2 standard. AAL-5 requires the greatest number of control bits (ten minimum), so a one word header is required. Only the required bits are active, according to the adaptation type selected and the direction. The least significant byte of the header word contain the UUI octet (AAL-5) and, in its least significant bit, the alignment indicator EIS (AAL-0/2). Bit 1 is the null indicator N (AAL-2). Bits 15/14 of the most significant byte contain LOS/LOD (AAL-0/1/2/5) and bits 11 to 8 contain a sixteen value code to specify packet length/service type (AAL-2). Optionally bits 13 to 8 contain the explicit packet length for non-AAL-2 connections. Unused bits are reserved (R).

In relation to providing a synchronous service, the packet interface of the preferred embodiment uses a fixed frame structure with allocated timeslots for each channel packet. Lower rate services have shorter packets, so use less of the allocated timeslot. The packet length is specified explicitly, or by a code field carried in the header word. Within a fixed structure, each packet has one header and one to four payload words (requiring a 16 bit wide data bus), with the next packet starting 6 cycles later, thus allowing a one cycle guard band (not mandatory, but useful if chips are to be wire-OR'ed on Egress).

For an interface operating at 50 MHz, and with a capacity of 8192 channels, a maximum integer number of six cycles per packet are available, so this format spreads the packets most evenly across the frame. Alternatively, using a five cycle period would allow the operating frequency to be reduced. The interface is operated at 1 ms repetition rate to give a maximum payload rate of 64 kbps per channel with an eight byte payload. At this rate of operation, the packet size is one G.711 EDU (encoding data unit), as specified in ITU-T I.366.2. Other frame rates are possible, ideally in steps of 1 ms, by increasing the number of payload bytes in proportion. There is no flow control on this interface, with packets having to be accepted as they arrive. However, multiple SSCS_V (service specific convergence layer—voice, part of the adaptation process in AAL-2) devices can be assigned to successive packets, limiting the processing rate of an individual device. Hence a 4 k channel device takes/sources every second packet. Preferably, the streams are combined by multiplexing or the use of high impedance (off) output drivers.

In relation to an exemplary direct identity packet interface embodying the present invention, such an interface is preferably used for communication between the adaptation device (SSCS_V) and a voice codec termination function, supporting a wider range of coding algorithms, and also to interwork between a data adaptation device (SSCS_D; differentiated by the "D" suffix) and a data termination function. The interface is devised to carry all ITU-T G.series voice codec services for AAL-2 adaptation and G.711 64 kbit/s for AAL-0, AAL-1 and AAL-5. Use is restricted to single channel adaptation. AAL-0 takes a 1–48 byte payload, AAL-1 takes 1–47 bytes (non-P format only) and AAL-5 takes 8–40 bytes to construct an ATM cell. The AAL-2 packet is of variable size, depending on the service type and the number of EDUs packed into an SDU.

The direct interface (DIPI) requires a local identifier (in addition to the User-User Indication (UUI) and controls) since packets arrive in any arbitrary order. Fourteen bits are needed for 16k channels. The packet length is already included. Hence a second header word is prepended with fourteen active bits. The definition and use of the control bits is unchanged, except that the LOS indication is redundant if service interface packet generation is suppressed whilst the LOS conditions persist. LOD indications may accompany valid data transfer to indicate discontinuity. Similarly, Null data is signified by no transfer.

As regards realisation of an asynchronous packet interface, such an interface is configured to transfer an asynchronous packet stream, with packet payloads of typically between one to sixty four bytes. For example, in AAL-2, the payload may contain one or more EDUs (up to an SDU) for any voice service, or other voice-associated data, such as SID (silence insertion descriptor) noise levels, etc. Voice services with different repetition rates can be simultaneously supported, allowing a complete mix of G.series coders on one device. Preferably, the interface is arranged as a 'one master, multiple slaves (SSCS_V)' device. In the Ingress direction, flow control is required to direct the flow of packets to multiple SSCS_V devices, and to limit the rate of transfer of packets into an SSCS_V which cannot sustain processing at the full interface rate. Each SSCS_V must have space available for one (or more) packets, before it responds to the master, which then arbitrates between competing demands. Traffic shaping is recommended to reduce both external storage requirements and packet delay variation generation at source. For this reason, it may be necessary to restrict the range of packet repetition rates to avoid short, frequent packets. In the Egress direction, the master arbitrates between SSCS_V devices that have packets available. Although the internal storage in the Egress of the SSCS_V allows packet transmission to be delayed, the master must provide sufficient access to prevent 'packet ready' queues from overflowing. To operate at, or near, full capacity, no back pressure (beyond that due to servicing multiple slaves) should be generated by the master.

An SSCS_D service packet interface requires, in a different optimization, direct identity and is used for communication between an adaptation device and data termination and/or DSP functions. One solution to the difficulty of interleaving time-dependent services with long duration messages, is to use separate interfaces for voice-based data services and data messages. For this reason two variants are specified, one for universal data services application, and a second optimised for voice-based data services.

Data messages of up to 65535 bytes in length for adaptation to AAL-2, by adopting I.366.1 formatting, and AAL-5 (message mode) are supported. The SSCS_D packet interface supports the AAL-2 Type 3 data services and also the AAL-_2 Type 1 fax image rates.

With regard to header requirements, in order to support 16 k channels with maximum length data messages, the header requires a 14-bit LID (local identifier) and a 16-bit length indicator, together with an 8-bit AAL-2/AAL-5 trailer UUI for user to user communication. In the Egress direction, Loss of Synchronisation (LOS) and Loss of Data (LOD) bits are also needed to indicate the quality of the data. The minimum header size is therefore six bytes.

To provide a voice-based data services there is also a requirement for a 14 bit LID, but the length requirement is reduced to 6 bits and no trailer UUI is required. For AAL-2 Type 3 Messages, a 6-bit Message Type, and (for Fax Image) a 3-bit BILO (Bits In Last Octet) and a one-bit End field is required. However, the Message Type field intrinsically defines the length of the packet, so allowing the control bits to be defined according to service type. In the Egress direction Loss of Synchronisation (LOS) and Loss of Data (LOD) bits are again needed. The requirements are satisfied by the provision of a four byte header.

For either usage the interface carries an asynchronous stream of packets containing the four or six byte header followed by the number of payload bytes specified by the Length or Message Type field of the header. The bytes are assembled into words to match the 16 bit wide interface; the lower byte of the last word is dummy data for odd payload lengths. The application requirement is for 'multiple master, multiple slave', hence the SSCS_D interface is required to be slave format. In the Ingress direction, flow control is required to direct the flow of packets to multiple SSCS_D devices, and to limit the rate of transfer of packets into an SSCS_D which cannot sustain processing at the full interface rate. Each SSCS_D must have space available for one (or more) packets, before it responds to the master, which then arbitrates between competing demands. In the Egress direction, the master arbitrates between SSCS_D devices that have packets available. Although the internal storage in the Egress of the SSCS_D allows packet transmission to be delayed, the master must provide sufficient access to prevent overflowing. To operate at, or near, full capacity, no back pressure (beyond that due to servicing multiple slaves) should be generated by the master.

Another version of the direct identity interface is defined to provide an alternative means of integrating data with voice services into the ATM cell stream (used between blocks 23 and 24 of FIG. 1). The services are cellified/ packetised by an external SSCS function before accessing the Ingress CPS 24 through this interface. A mixture of voice and non-voice data services is possible, as long as only complete SDUs are transferred in the Ingress direction, and where long data packets have been segmented. The Egress direction will transfer SDU fragments that will require re-assembly. Concerning the header requirement, the header requires 14-bits for the LID (16 k channels), 6-bits for Length, 1-bit for flow control (FC) and 5 bits for the AAL-2 header UUI, an F5 OAM cell identifier bit and 2-bits for partial/full/discard (PFD). For F5 OAM cells and non-AAL-2, the Header UUI field is used for carrying PTI (bits 2-0) and CLP (bit3) from the ATM cell header, whilst bit 4 is Reserved (R). The PFD filed is used in the Egress direction on AAL-2 packets, which can be spread over one to three ATM cells, separated by cells carrying other VC traffic. The F bit is used in the Egress interface to indicate congestion in the Ingress, allowing the SSCS function to reduce throughput.

As regards format, in the Ingress direction, full or partial packets are transferred. For non-AAL-2, the payload size is 48 bytes, the complete ATM cell payload. For AAL-2 the payload size is 1 to 64 bytes, the CPS-Packet Payload (including timestamp, triple redundancy and trailer, if required); the three byte CPS-Packet Header is constructed from data in bytes H1 to H4 in the CPS. The interface uses flow control in a 'one slave (the CPS), one master' configuration. This allows the master to start and interrupt transmission at will, any time after the CPS has signalled space for one (or more) cells/packets. In the Egress direction, due to the multiplexing of AAL-2 packets, partial packets are received which must traverse the interface. Hence partial, full and discard controls are provided for AAL-2 packets. The partial indication is set on the first or subsequent incomplete packet, whilst the full indication is used on a total or completing packet. The discard indication is used to cause a fragment, that has been sent, to be purged when a subsequent part of the same packet is lost. The Egress direction is also nominally a 'one slave (the CPS), one master' configuration. However, no back pressure is permitted on the CPS, so the master must enable the transfer as soon as a cell is available, and complete it without interruption i.e. the enable must always be active. Since the configuration is 'one slave, one master', the optional Utopia address signals TxAddr and RxAddr are not required and TxClav and RxClav are each reduced to single signals.

In relation to the header and use of variable length packets, the preferred embodiments of the present invention contemplate the optional use of an additional bit for protection of information on the data bus. Preferably, odd parity is selected since it gives protection against "stuck-at" faults on the whole bus, as well as individual bits. Furthermore, additional detection of satisfactory operation of the packet interface may be provided by occasional transmission of test packets, by assigning one or more packet identities or packet positions for test transmission. Testing exercises the header features' integrity by, for instance, transmission of a pseudo-random data sequence using the header controls to synchronise the pattern and vary the length. More than one test packet may be required when interfacing to multiple physical interfaces.

It will, of course, be understood that the above description has been given by way of example only and that modifications in detail may be made within the scope of the present invention. For example, in the context of the present invention, the term "subscriber terminal" should not be considered as limiting since the mechanism of the present invention is applicable to a multitude of connections, including terminals and exchanges that are the addressed units within the broadband domain.

Figure 4:
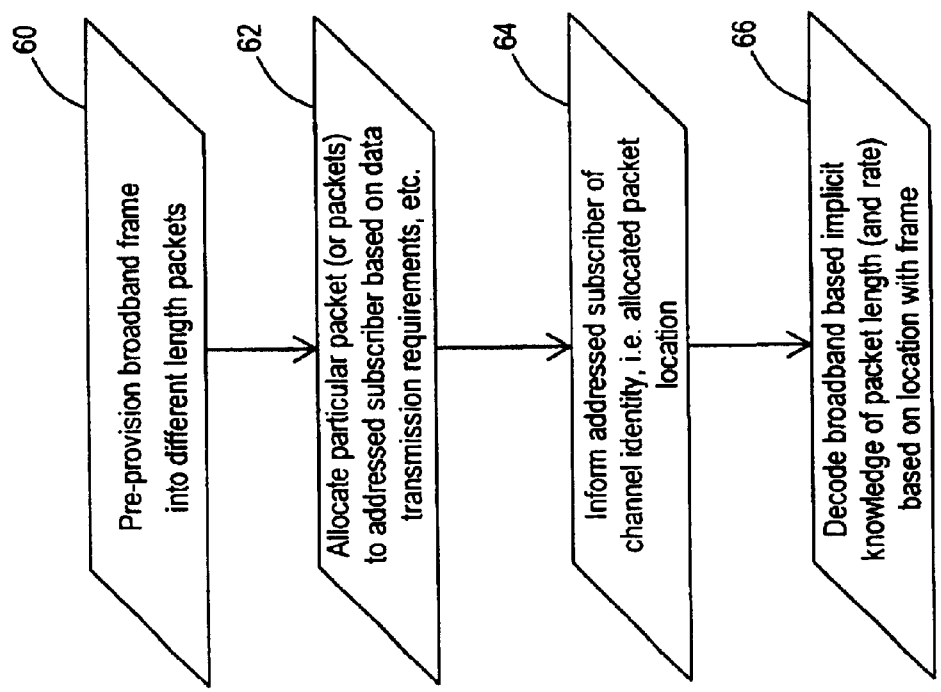
FIG. 4 is a flow chart showing preferred steps of a second packetisation process according to the present invention.

The first embodiment and the second embodiment (FIGS. 3 and 4, respectively) can be practised separately or in combination.

What is claimed is:

1. A method of sending information in packets over a multiplicity of frames, the method comprising:

pre-partitioning each frame into a plurality of slots of which at least one has a differing duration to the others, each of the plurality of slots being associated with at least a respective defined packet length and a channel; and packetising call information into a slot of a pre-partitioned frame allocated to a call for transmission of said call information to an addressed unit, the packetised call information containing a truncated header of reduced length arising from the slot allocated to the call inherently identifying the defined packet length thereof and the channel through said slot's association with a respective defined packet length and a channel for said slot in said pre-partitioned frame.

2. The method according to claim 1, wherein the frames are each pre-partitioned in an identical fashion.

3. The method according to claim 1, wherein a slot assigned to the call is identical between contiguous frames.

4. The method according to claim 1, wherein a slot assigned to the call is varied between contiguous frames according to a predetermined sequence.

5. The method according to claim 1, wherein the packet is a non-standard sized ATM packet in a broadband domain, and where conversion between the broadband domain and a narrowband domain occurs.

6. The method according to claim 1, wherein a slot position is identified relative to a fixed timing structure.

7. The method according to claim 1, further comprising assessing at least one of a data transmission requirement for the call and a processing capability of an addressed unit of the call before allocating the slot.

8. The method according to claim 1, further comprising notifying the addressed subscriber unit of the slot allocated to the call.

9. A packet interface for coupling between a narrowband domain and a broadband domain, the packet interface arranged to packetise information from the narrowband domain to the broadband domain into variable length packets, the packet interface having associated therewith:

a processor arranged to construct a plurality of contiguous frames with each frame pre-partitioned into a plurality of slots of which at least one has a differing duration to the others, each of the plurality of slots being associated with at least a respective defined packet length and a channel, the processor further comprising:

means to packetise call information from the narrowband domain into a slot of a pre-partitioned frame selectively allocated to a call for transmission of said call information to an addressed unit, the packetised call information containing a truncated header of reduced length arising from the slot allocated to the call inherently identifying the defined packet length thereof and the channel through said slot's association with a respective defined packet length and a channel for said slot in said pre-partitioned frame.

10. The packet interface according to claim 9, wherein the processor further comprises:

means to assess at last one of a data transmission requirement for the call and a subscriber processing capability of the addressed unit in the call; and means to select and allocate the slot within the frame based on the assessment.

11. The packet interface according to claim 9, wherein the processor further comprising means for notifying the addressed unit of the slot allocated to the call.

12. The method according to claim 1, comprising:

receiving information from a channel and constructing at least one intermediate packet associated with that channel during a first time segment;

generating an intermediate packet header having an intermediate packet length indication identifying a number of intermediate bytes received from the channel within the first time segment;

communicating the intermediate packet header and the at least one intermediate packet to a broadband signal processor;

receiving the intermediate packet header at the broadband signal processor and interrogating the intermediate packet header to identify the number of intermediate bytes that can be expected at the broadband signal processor during a second time segment;

determining whether the at least one intermediate packet to be received at the broadband signal processor should be temporarily stored or converted into a broadband packet for onward transmission; and generating a broadband packet including a header containing a length indication if the at least one intermediate packet is to be converted into a broadband packet for substantially instantaneous onward transmission, else temporarily storing the at least one intermediate packet and incrementing a record of a number of intermediate packets temporarily stored in relation to said channel.

13. The method of sending information in packets according to claim 12, wherein the length indication in the broadband packet is variable and dependent upon the number of intermediate packets that are to be transmitted in the broadband packet.

14. The method of sending information in packets according to claim 12, further comprising repeatedly storing contiguous intermediate packets incident on the broadband signal processor during successive time segments and incrementing the record of the number intermediate packets temporarily stored in relation to said channel.

15. The method of sending information in packets according to claim 14, further comprising:
    comparing the record of the number of intermediate packets with a predetermined threshold and constructing a broadband packet and associated length indicating when the record of the number of intermediate packets is at least equal to the predetermined threshold.

16. The method of sending information in packets according to claim 12, wherein the step of temporarily storing the intermediate packets is overridden on the basis of one of an addressing unit's identity and an addressed unit's identity.

17. A packet interface according to claim 9, comprising:
    a) a first buffer and processor combination arranged to receive information form a channel and to construct intermediate packets associated with that channel during a first time segment, the processor including:
        means for generating an intermediate packet header having an intermediate packet length indication identifying a number of intermediate bytes received from the channel within the first time segment; and
        means for communicating the intermediate packet header and the intermediate packets to a broadband signal processor;
    b) a signal processor and channel buffer combination, the signal processor coupled to received the intermediate packet header and arranged to interrogate the intermediate packet header to identify the number of intermediate bytes that can be expected at the broadband signal processor during a second time segment, the signal processor further comprising:
        means for determining whether the intermediate packet to be received should be temporarily stored or converted into a broadband packet for onward transmission; and
        means for generating a broadband packet including a header containing a length indication if an incident intermediate packet is to be converted into a broadband packet for substantially instantaneous onward transmission, else means for temporarily storing the incident intermediate packet in the channel buffer and incrementing a record of a number of intermediate packet temporarily stored in relation to said channel.

18. The packet interface according to claim 17, wherein the length indication in the broadband packet is variable and dependent upon the number of intermediate packets that are to be transmitted in the broadband packet.

19. The packet interface according to claim 17, wherein the signal processor and channel buffer are further arranged to repeatedly store contiguous intermediate packets incident on the broadband signal processor during successive time segments and wherein the signal processor further includes means for incrementing the record of the number intermediate packets temporarily stored in relation to said channel.

20. The packet interface according to claim 17, wherein the signal processor further comprises:
    means for comparing the record of the number of intermediate packets with a predetermined threshold; and
    means for constructing a broadband packet and associated length indication when the record of the number of intermediate packets is at least equal to the predetermined threshold.

21. The packet interface according to claim 17, wherein the signal processor is arranged to override the temporarily storing of the intermediate packets on the basis of one of an addressing unit's identity and an addressed unit's identity.

22. A communications network comprising:
    a broadband communications network;
    a narrowband communications network; and
    a packet interface for coupling said broadband and narrowband communications networks, the packet interface being arranged to packetise information from the narrowband domain to the broadband domain into variable length packets, the packet interface having associated therewith:
        a processor arranged to construct a plurality of contiguous frames with each frame pre-partitioned into a plurality of slots of which at least one has a differing durations to the others, each of the plurality of slots being associated with at least a respective defined packet length and a channel, the processor further comprising:
            means to packetise call information from the narrowband domain into a slot of a pre-partitioned frame selectively allocated to a call for transmission of said call information to an addressed unit, the packetised call information containing a truncated header of reduced length arising from the slot allocated to the call inherently identifying the defined packet length thereof and the channel through said slot's association with a respective defined packet length and a channel for said slot in said pre-partitioned frame.

* * * * *